US012612121B2

(12) United States Patent (10) Patent No.: US 12,612,121 B2
Favaretto (45) Date of Patent: Apr. 28, 2026

(54) CAR PROVIDED WITH A PNEUMATIC UNIT OPERATED BY A GEARBOX

(71) Applicant: FERRARI S.P.A., Modena (IT)

(72) Inventor: Fabrizio Favaretto, Modena (IT)

(73) Assignee: FERRARI S.P.A., Modena (IT)

( * ) Notice: Subject to any disclaimer, the term of this patent is extended or adjusted under 35 U.S.C. 154(b) by 322 days.

(21) Appl. No.: 18/591,525

(22) Filed: Feb. 29, 2024

(65) Prior Publication Data

US 2024/0294216 A1    Sep. 5, 2024

(30) Foreign Application Priority Data

Mar. 3, 2023    (IT) ........................ 102023000003864

(51) Int. Cl.
 *B62D 35/02*        (2006.01)
 *B62D 35/00*        (2006.01)
 *B62D 37/02*        (2006.01)
(52) U.S. Cl.
 CPC ............. *B62D 35/02* (2013.01); *B62D 35/00* (2013.01); *B62D 37/02* (2013.01)
(58) Field of Classification Search
 CPC ...... B62D 35/00; B62D 35/007; B62D 35/02; B62D 37/02
 USPC ....................................................... 296/180.1
 See application file for complete search history.

(56) References Cited

U.S. PATENT DOCUMENTS 6,068,328 A * 5/2000 Gazdzinski ............ B62D 35/00
                                                              296/180.1
9,950,611 B2 * 4/2018 Pfeiffer .................. B62D 35/02

FOREIGN PATENT DOCUMENTS

| DE | 102019000358 A1 * | 7/2020 | ............. B62D 35/02 |
|----|----|----|----|
| EP | 0607270 A1 | 12/1995 | |
| EP | 1752364 A1 * | 2/2007 | ............. B62D 35/02 |
| EP | 2193984 A1 | 6/2010 | |
| GB | 2611957 A * | 4/2023 | ............. B62D 37/02 |
| JP | H04339079 A | 11/1992 | |
| WO | 8809737 A1 | 12/1988 | |

OTHER PUBLICATIONS

Italian Search Report in IT Application No. 202300003864 mailed Sep. 1, 2023, an English Translation attached hereto (9 pages).

* cited by examiner

*Primary Examiner* — Jason S Daniels
(74) *Attorney, Agent, or Firm* — Leason Ellis LLP

(57)        ABSTRACT

A car has a gearbox, which is interposed between the engine and two drive wheels and has at least one input shaft connected to a drive shaft of the engine and at least one output shaft connected to the drive wheels; a rear bottom, which defines part of a lower floor of the car and is provided with a pneumatic unit configured to blow a first air flow in the direction of a road surface and/or to suck part of a second air flow flowing under the lower floor during the normal operation of the car; and a coupling device to connect a transmission shaft of the pneumatic unit and the input shaft or the output shaft of the gearbox to one another.

8 Claims, 6 Drawing Sheets

CAR PROVIDED WITH A PNEUMATIC UNIT OPERATED BY A GEARBOX

CROSS-REFERENCE TO RELATED APPLICATIONS

This patent application claims priority from Italian patent application no. 102023000003864 filed on Mar. 3, 2023, the entire disclosure of which is incorporated herein by reference.

TECHNICAL FIELD

The present invention relates to a car.

In particular, the present invention relates to a car of the type comprising a support frame defining part of a lower floor of the car; a passenger compartment mounted on the support frame and projecting upwards from the lower floor; an engine to move the car; and an aerodynamic bottom fixed to the support frame and defining part of the lower floor.

BACKGROUND

The aerodynamic bottom comprises a front bottom mounted in the area of a front zone of the car, a rear bottom mounted in the area of a rear zone of the car, and a central bottom mounted in the area of a central zone of the car.

The rear bottom comprises a box-shaped body, defining a pneumatic chamber, and is bounded by a lower wall facing a road surface and provided with a plurality of openings to connect the pneumatic chamber to the outside.

The pneumatic chamber defines part of a pneumatic unit configured to blow a first air flow out of the pneumatic chamber through the above-mentioned openings and in the direction of the road surface and/or to suck part of a second air flow flowing under the lower floor into the pneumatic chamber through the above-mentioned openings during the normal operation of the car.

The pneumatic unit further comprises a pneumatic device, which may alternatively be a reversible pneumatic device configured both to blow the first air flow in the direction of the road surface and to suck part of the second air flow, or a pneumatic compressor device to blow the first air flow in the direction of the road surface or a pneumatic suction device to suck part of the second air flow.

Since the pneumatic device of the pneumatic unit is normally operated by an electric motor, known cars of the type described above have some drawbacks mainly due to the fact that the pneumatic unit is relatively complex and expensive, and the car has relatively high weight and big overall dimensions.

SUMMARY

The object of the present invention is to provide a car, which is free of the above-mentioned drawbacks and simple and inexpensive to manufacture.

According to the present invention, a car is provided as claimed in the appended claims.

BRIEF DESCRIPTION OF THE DRAWINGS

The present invention will now be described with reference to the accompanying drawings, which illustrate a non-limiting embodiment thereof, wherein.

DESCRIPTION OF EMBODIMENTS

Figure 1:
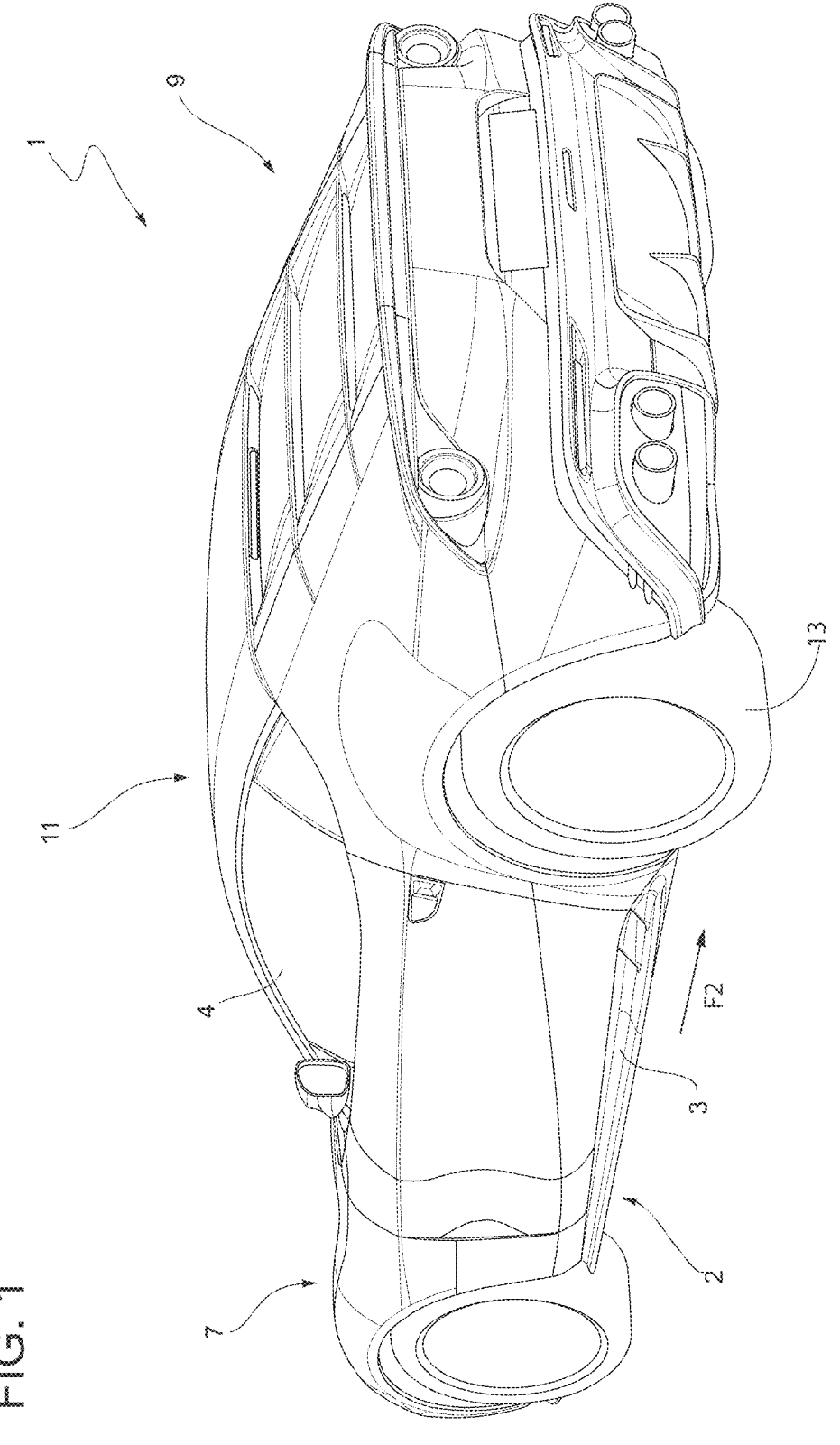
FIG. 1 is a schematic perspective view, with parts removed for clarity, of a preferred embodiment of the car of the present invention.
Figure 2:
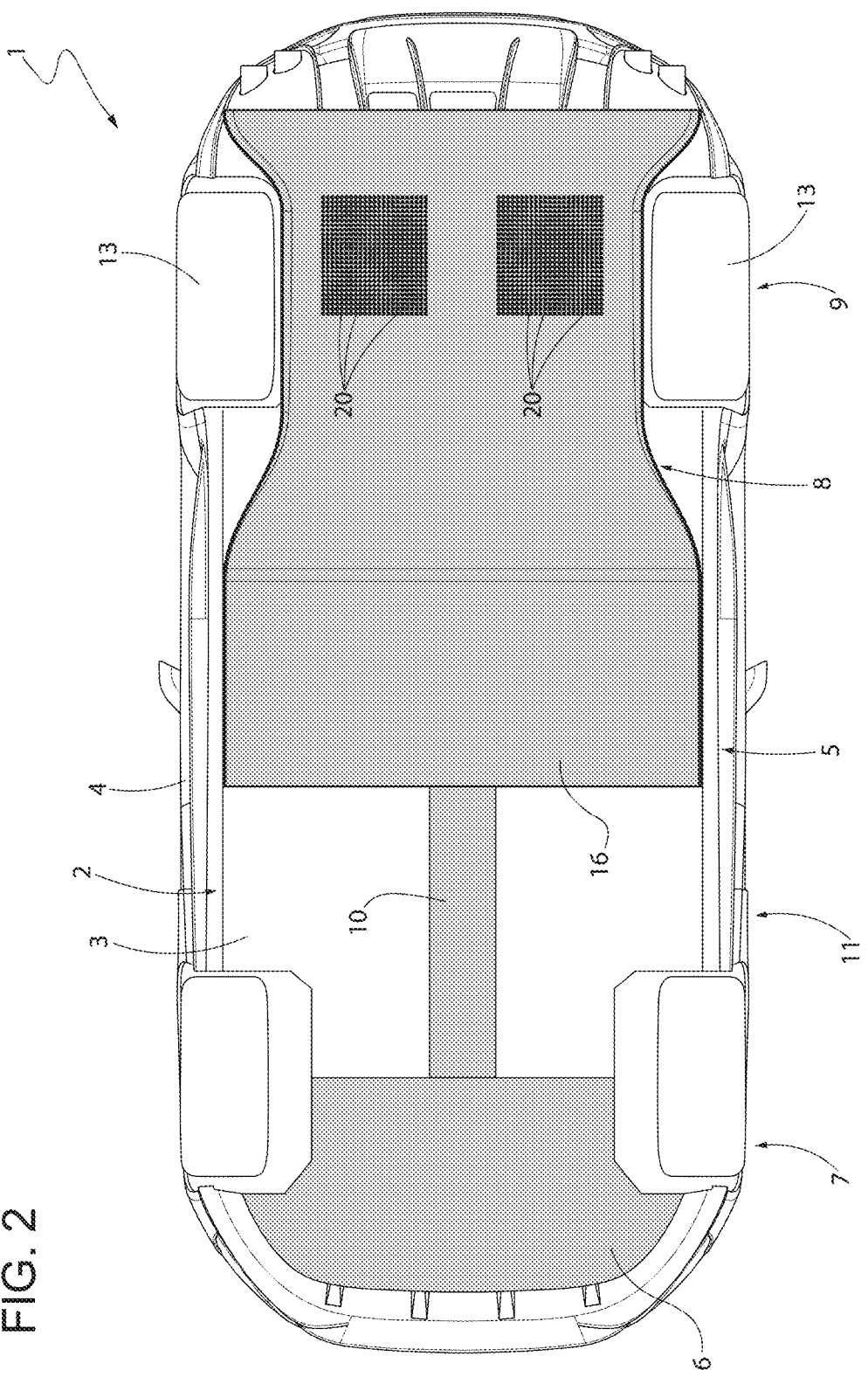
FIG. 2 is a schematic bottom view, with parts removed for clarity, of the car in FIG. 1.

With reference to FIGS. 1 and 2, number 1 indicates, as a whole, a car, in particular a sports car, comprising a support frame 2 defining part of a lower floor 3 of the car 1.

The car 1 also comprises a passenger compartment 4 mounted on the frame 2 and projecting upwards from the floor 3, and an aerodynamic bottom 5 fixed to the frame 2 and defining part of the floor 3.

The bottom 5 comprises a front bottom 6 fixed to the frame 2 in the area of a front zone 7 of the car 1, a rear bottom 8 fixed to the frame 2 in the area of a rear zone 9 of the car 1, and an elongated central bottom 10 fixed to the frame 2 between the bottoms 6 and 8 in the area of a central zone 11 of the car 1.

The car 1 further comprises an engine 12 of a known type, which is mounted in the centre of the rear zone 9 and is connected to two rear drive wheels 13 of the car 1 via the interposition of a gearbox 14 of a known type.

The car 1 is also provided with at least one clutch 15 of a known type to connect a drive shaft (not shown) of the engine 12 and an input shaft (not shown) of the gearbox 14 to one another in a releasable manner.

Figure 3:
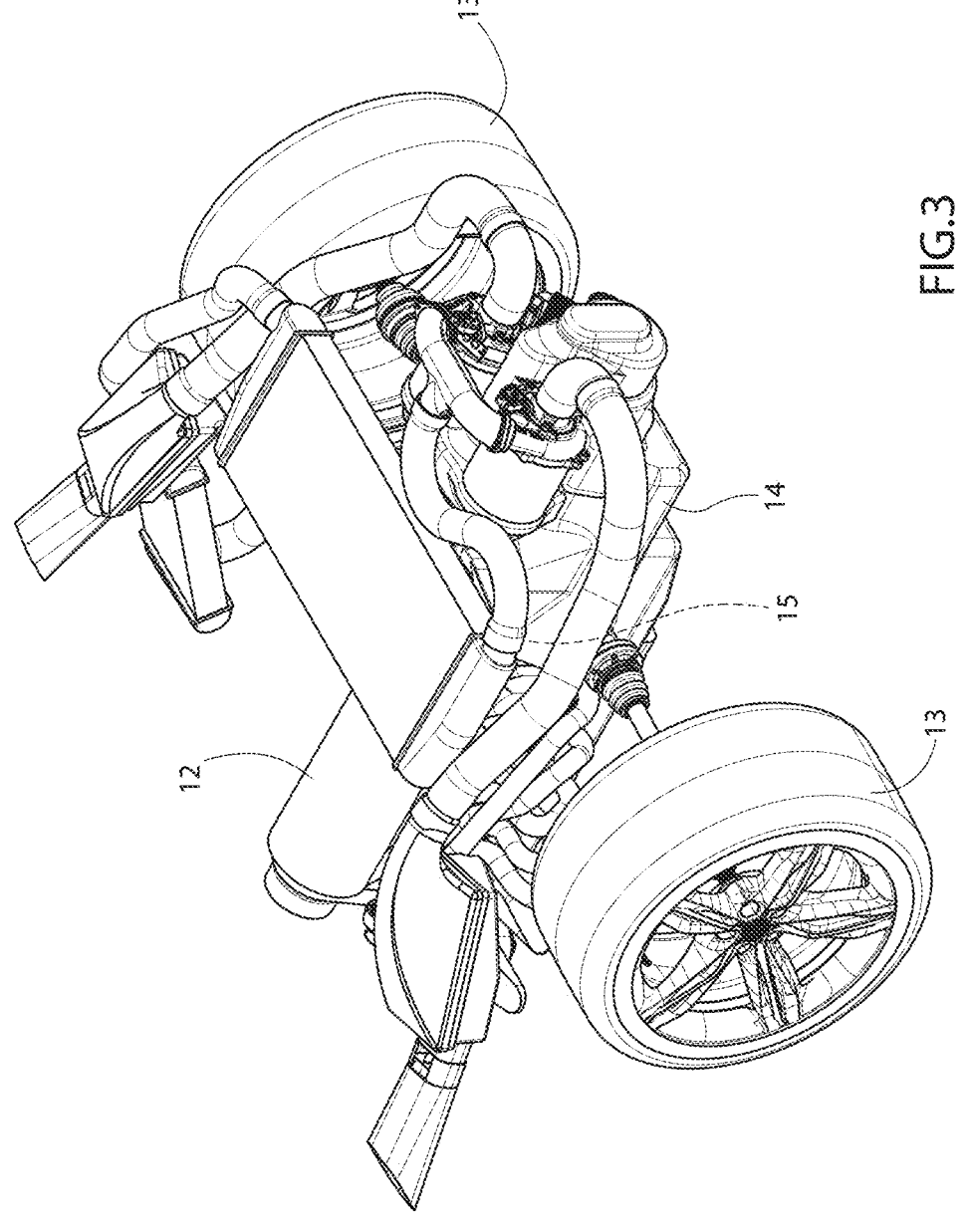
FIG. 3 is a schematic perspective view, with parts removed for clarity, of a detail of the car in FIG. 1.
Figure 4:
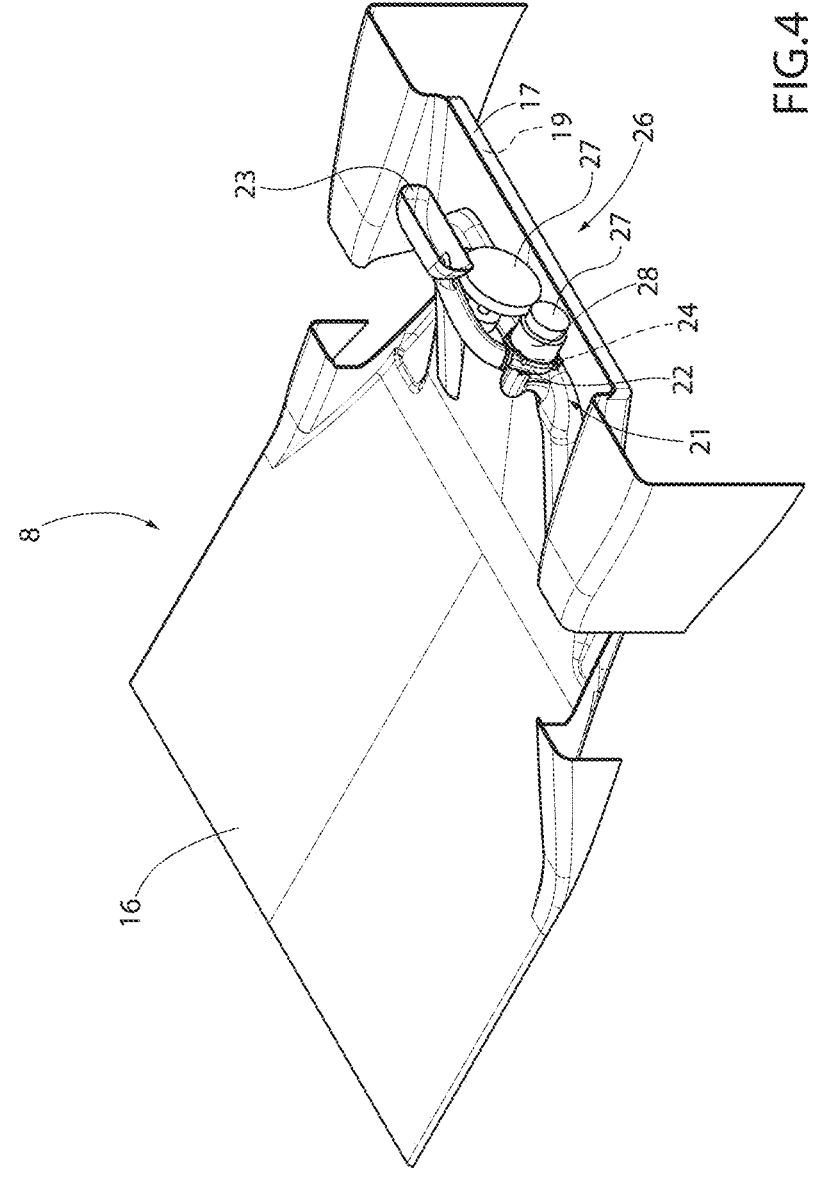
FIGS. 4-6 are three schematic perspective views, with parts in section and parts removed for clarity, of a detail of FIG. 3.
Figure 5:
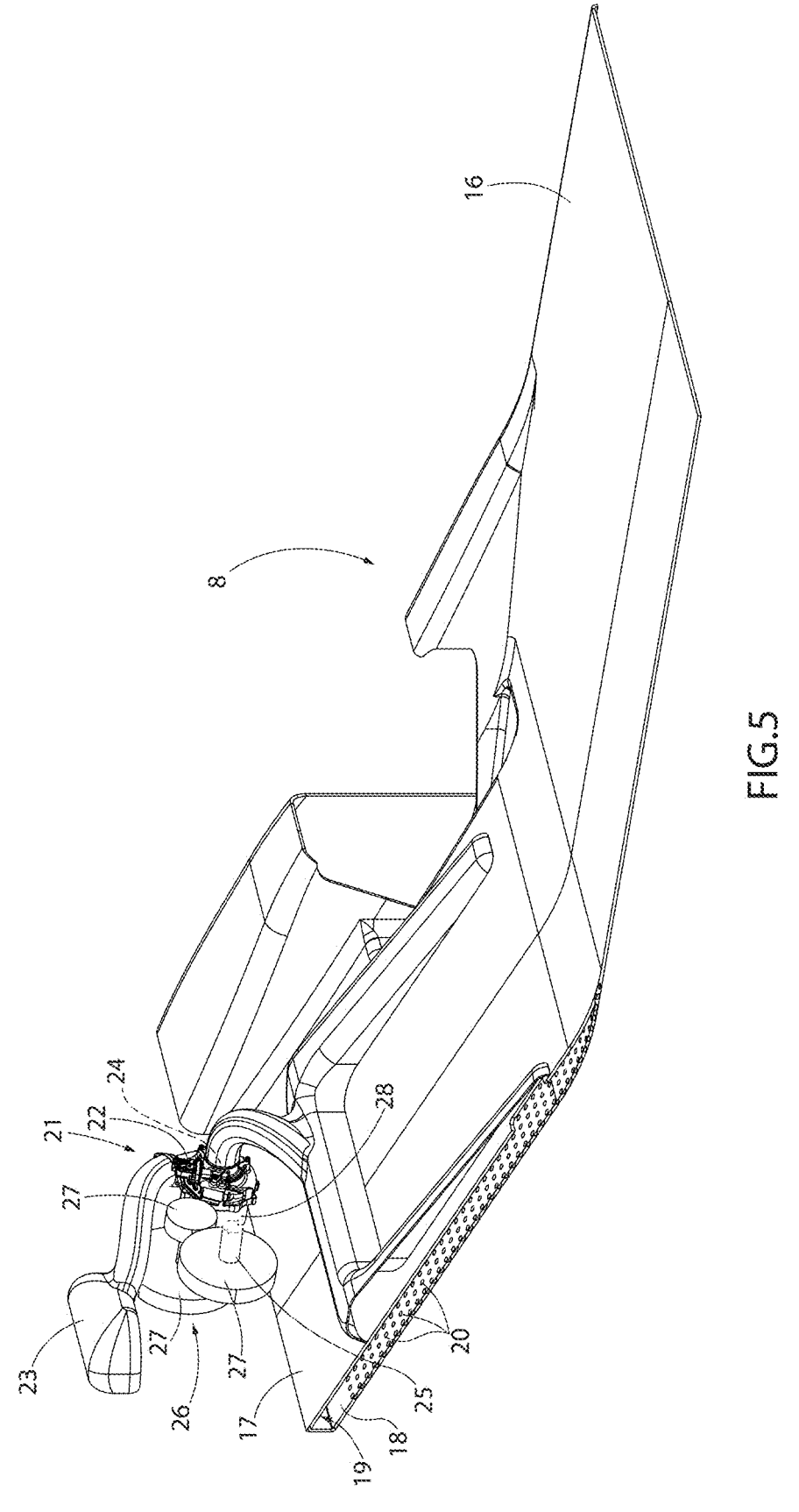
Figure 6:
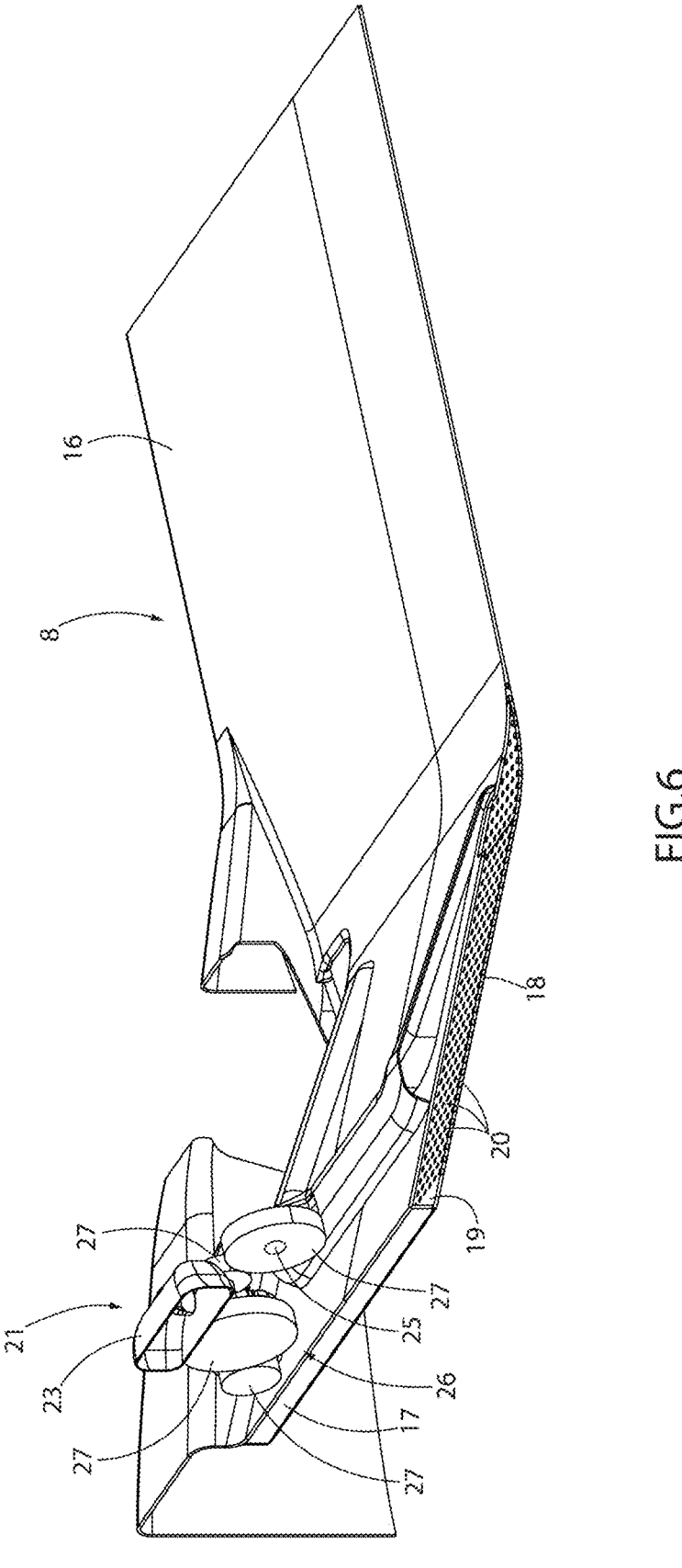

As shown in FIGS. 2, 3, and 4, the rear bottom 8 comprises a front plate 16 and a rear box-shaped body 17 arranged in succession along the rear zone 9 of the car 1.

The body 17 is bounded by a lower wall 18 facing a road surface (not shown) and defines a pneumatic chamber 19, which communicates with the outside through a plurality of openings 20 obtained through the wall 18.

The chamber 19 defines part of a pneumatic unit 21 comprising also, in this case, a compressor device 22, which is mounted on the body 17, is provided with an air vent 23 communicating with the outside, and is pneumatically connected to the chamber 19.

The compressor device 22 is operated to blow an air flow F1 out of the chamber 19 through the openings 20 and in the direction of the road surface (not shown) to selectively control the aerodynamic set-up of the car 1 according to an operating parameter, e.g. the speed, of the car 1 and/or a geometric parameter of a driving path (not shown) of the car 1.

The device 22 has a transmission shaft 24 connected to the aforementioned input shaft (not shown) or to an output shaft 25 of the gearbox 14 via the interposition of a train 26 of gears 27, one of which is splined on the input shaft (not shown) or on the output shaft 25 of the gearbox 14 and the other is connected in a releasable manner to the shaft 24 via the interposition of a clutch 28.

According to a variant not shown, the compressor device 22 is removed and replaced by a suction device operated to draw into the chamber 19 through the openings 20 part of an air flow F2 flowing under the floor 3 from the front zone 7 to the rear zone 9 during the normal operation of the car 1 to selectively control the aerodynamic set-up of the car 1 according to an operating parameter, e.g. the speed, of the car 1 and/or a geometric parameter of a driving path (not shown) of the car 1.

According to a further variant, not shown, the compressor device 22 is removed and replaced by a reversible pneumatic device having a first mode of operation, in which the reversible pneumatic device is operated to blow the air flow F1 out of the chamber 19 through the openings 20, and a second mode of operation, in which the reversible pneumatic device is operated to suck into the chamber 19 through the openings 20 part of the air flow F2 flowing under the floor 3 of the car 1.

Since the pneumatic unit 21 is operated by the gearbox 14 via the interposition of the train 26 of gears 27 and clutch 28, the pneumatic unit 21 is relatively simple and inexpensive and the car 1 has relatively low weight and small overall dimensions.

The invention claimed is:

1. A car comprising a support frame (2) defining part of a lower floor (3) of the car; a passenger compartment (4) projecting upwards from the lower floor (3); an engine (12) to move the car; two drive wheels (13); a gearbox (14), which is interposed between the engine (12) and the drive wheels (13) and has at least one input shaft connected to a drive shaft of the engine (12) and at least one output shaft (25) connected to the drive wheels (13); an aerodynamic bottom (5), which is at least partly fixed to the support frame (2), defines part of the lower floor (3) and comprises, in turn, a rear bottom (8), which is mounted in the area of a rear zone (9) of the car and is provided with a pneumatic unit (21) configured to blow a first air flow (F1) in the direction of a road surface and/or to suck part of a second air flow (F2) flowing under the lower floor (3) during the normal operation of the car; and characterized by the fact that it further comprises a coupling device (26) to connect a transmission shaft (24) of the pneumatic unit (21) and the input shaft or the output shaft (25) of the gearbox (14) to one another so as to operate the pneumatic unit (21) through the gearbox (14).

2. The car according to claim 1 and further comprising at least one first clutch (15) to connect the drive shaft of the engine (12) and the input shaft of the gearbox (14) to one another in a releasable manner.

3. The car according to claim 1 and further comprising at least one second clutch (28) to connect the transmission shaft (24) of the pneumatic unit (21) and the input shaft or the output shaft (25) of the gearbox (14) to one another in a releasable manner.

4. The car according to claim 1, wherein the pneumatic unit (21) comprises at least one reversible pneumatic device configured both to blow the first air flow (F1) in the direction of the road surface and to suck part of the second air flow (F2); the coupling device (26) being configured to connect the transmission shaft (24) of the reversible pneumatic device and the input shaft or the output shaft (25) of the gearbox (14) to one another.

5. The car according to claim 1, wherein the pneumatic unit (21) comprises a pneumatic blowing device to blow the first air flow (F1); the coupling device (26) being configured to connect the transmission shaft (24) of the pneumatic blowing device and the input shaft or the output shaft (25) of the gearbox (14) to one another.

6. The car according to claim 1, wherein the pneumatic unit (21) comprises a pneumatic sucking device to suck part of the second air flow (F2); the coupling device (26) being configured to connect the transmission shaft (24) of the pneumatic sucking device and the input shaft or the output shaft (25) of the gearbox (14) to one another.

7. The car according to claim 1, wherein the pneumatic unit (21) comprises a pneumatic chamber (19) obtained in the rear bottom (8) and a plurality of openings (20) obtained through a lower wall (18) of the rear bottom (8) in order to connect the pneumatic chamber (19) to the outside under the lower floor (3).

8. The car according to claim 1, wherein the coupling device (26) comprises a train of gears (27), one of them splined on the input shaft or on the output shaft (25) of the gearbox (14) and one of them being connected to the transmission shaft (24) of the pneumatic unit (21).

* * * * *